(12) United States Patent
Monti

(10) Patent No.: US 6,966,423 B2
(45) Date of Patent: Nov. 22, 2005

(54) STATION FOR CONNECTING A PACKAGING MACHINE, IN PARTICULAR BLISTERING MACHINE, WITH A FEEDING LINE, LEADING TO A BOXING MACHINE

(75) Inventor: Giuseppe Monti, Pianoro (IT)

(73) Assignee: Marchesini Group, S.p.A., Bologna (IT)

( * ) Notice: Subject to any disclaimer, the term of this patent is extended or adjusted under 35 U.S.C. 154(b) by 0 days.

(21) Appl. No.: 10/991,585

(22) Filed: Nov. 18, 2004

(65) Prior Publication Data

US 2005/0103598 A1 May 19, 2005

(30) Foreign Application Priority Data

Nov. 19, 2003 (IT) .......................... BO2003A0691

(51) Int. Cl.$^7$ ............................................. B65G 47/12
(52) U.S. Cl. ...................... 198/449; 198/447; 198/452; 198/456
(58) Field of Search ............................... 198/449, 447, 198/448, 452, 456

(56) References Cited

U.S. PATENT DOCUMENTS

| | | | | |
|---|---|---|---|---|
| 3,339,701 A | * | 9/1967 | Weichhand | 198/449 |
| 3,511,357 A | * | 5/1970 | Vanderhoof | 198/436 |
| 3,749,225 A | * | 7/1973 | Kennedy | 198/890.1 |
| 3,774,748 A | * | 11/1973 | Dederer et al. | 198/444 |
| 3,809,207 A | * | 5/1974 | Euverard | 198/458 |
| 4,319,676 A | * | 3/1982 | Turnbough | 198/449 |

* cited by examiner

Primary Examiner—Richard Ridley
(74) Attorney, Agent, or Firm—William J. Sapone; Henry D. Coleman; R. Neil Sudol

(57) ABSTRACT

A station for connecting a blistering machine with a boxing machine includes an endless conveyor defining an inlet section, where articles are received from a blistering machine, and an outlet section cooperating with the boxing machine. A series of bars are connected at the ends with a couple of endless chains for supporting and guiding crosswise a number of carriages. The carriages have pins projecting within a first and second track to move the carriages crosswise from a first configuration, near the inlet section, in which a first series of carriages are longitudinally offset with respect to a second series of carriages, to a second configuration, near the outlet section, in which the carriages are all longitudinally aligned.

10 Claims, 5 Drawing Sheets

STATION FOR CONNECTING A PACKAGING MACHINE, IN PARTICULAR BLISTERING MACHINE, WITH A FEEDING LINE, LEADING TO A BOXING MACHINE

FIELD OF THE INVENTION

The present invention relates to the technical field concerning automatic packaging of various articles.

In particular, the present invention relates to a station, which connects a packaging machine, especially blistering machine, with a feeding line of a boxing machine.

DESCRIPTION OF PRIOR ART

One of the most frequently reported problems of the technical field related to the automatic packaging of articles is the transferring of articles released by the cutting station of a blistering machine, usually arranged side by side and in one or more rows, to the box-like compartments of a conveyor connected to the feeding line of the packaging machine.

Therefore, in most cases a connecting station is used for transferring the articles, arranged in one or more rows, released by the blistering machine to a line feeding the corresponding boxing machine, situated in cascade.

The document WO 00/68086 proposes a device for transferring blister packs from a cutting station to a receiving line, which includes a pair of arms, first and second, of different length, equipped at one end with gripping means, and supported at the other end, with possibility of rotation about parallel axes, crosswise to the forward movement direction of the receiving line.

The arms are made to oscillate simultaneously from a first position, in which the gripping means are situated at the cutting station to pick up a blister pack, to a second position, in which the gripping means are brought to the receiving line to release the picked up blister packs onto first and second conveying belts, offset with respect to one another and to the forward movement direction.

A workstation is situated downstream of the above described device, to cooperate with the first and second conveyors, which transfer the piles of blister packs, by suitable pusher means, to the compartments of a third conveyor, which feeds a boxing machine.

The document U.S. Pat. No. 6,092,979 proposes a device acting on a pair of lines, on which piles of blister packs are formed, spaced out by a prefixed step P.

Suitable pulling means move the spaced piles by a step 2P, that is double with respect to the previous one, and then the piles are introduced into relative compartments belonging to two lines arranged one beside the other.

With the help of a group of transversal pushers, the piles of blister packs of one line are transferred to the empty compartments without the piles of the other line, so that all the piles of blister packs are introduced in the compartments of only one line, which feeds a packaging machine.

SUMMARY OF THE INVENTION

The object of the present invention is to propose a station for connecting a packaging machine, in particular blistering machine, with a feeding line leading to a boxing machine.

The proposed connection station must ensure the substantial alignment of the articles released by the blistering machine, arranged in one or more rows, and consequently it must allow feeding of the boxing machine.

Another object of the present invention is to propose a connection station, which ensures high reliability and productivity standards in any working conditions.

A further object of the present invention is to propose a connection station, which is particularly versatile, especially with different types of packaging machines, in particular blistering machines, situated upstream, and allows to feed articles in controlled configurations, which vary within a wide range, to any boxing machine situated afterwards.

A still further object of the present invention is to propose a particularly compact and strong connection station, which ensures particularly simple and easy adjustment, installation and maintenance operations.

The above mentioned objects are obtained, in accordance with the contents of the claims, by a station for connecting a packaging machine, in particular a blistering machine, with a feeding line associated to a boxing machine, the station including: an endless conveyor, whose upper run is oriented according to a substantially horizontal moving plane, which defines an inlet section, situated upstream, where said upper run of the conveyor receives articles from the blistering machine, and an outlet station, situated downstream and cooperating with the feeding line of the boxing machine to release said articles; means, cooperating with said conveyor, spaced out with respect to the forward movement direction, for supporting and guiding carriages for carrying at least one article, said means causing crosswise motion of the carriages with respect to said forward movement direction; first and second means, cooperating with said conveyor, operating, crosswise with respect to the forward movement direction, respectively even carriages and odd carriages, from a first configuration, near the inlet section, in which said even carriages are longitudinally offset, that is transversely spaced apart with respect to the odd carriages, to a second configuration, near said outlet section, in which said even carriages are aligned with said odd carriages with respect to the forward movement direction.

BRIEF DESCRIPTION OF THE DRAWINGS

The characteristic features of the invention will be pointed out in the following description of some preferred but not exclusive embodiments, with reference to the enclosed figures, in which.

DESCRIPTION OF THE PREFERRED EMBODIMENTS

With reference to the above Figures, general reference number 1 indicates the proposed station for connection a packaging machine, in particular blistering machine, with a feeding line leading to a boxing machine.

For sake of clarity, the blistering machine, as well as the boxing machine with its feeding line have not been shown intentionally in the enclosed figures, because they are well known by those skilled in the art.

Figure 1:
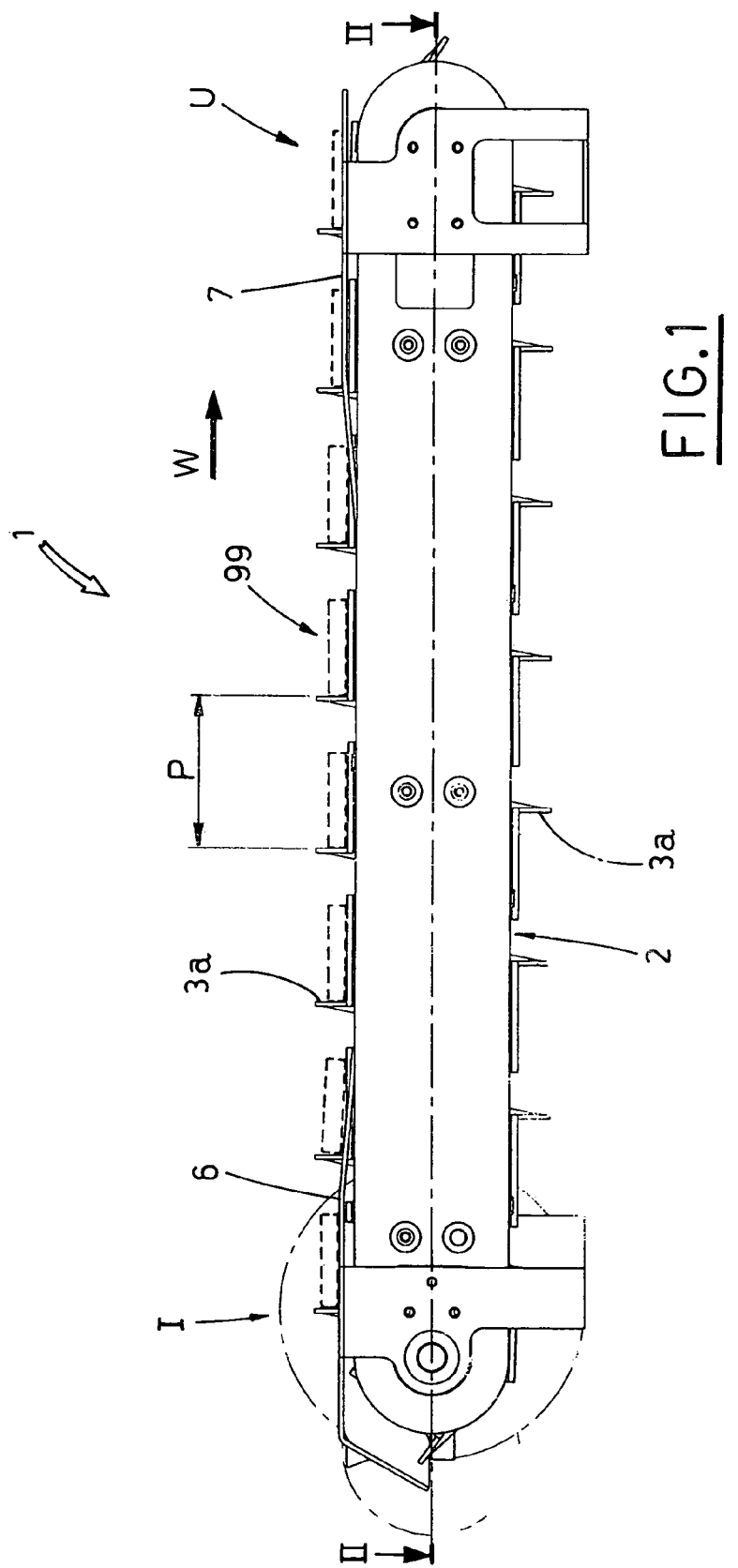
FIG. 1 is a schematic, lateral view of the proposed connection station.

The station 1 includes an endless conveyor 2, whose upper run is oriented according to a substantially horizontal moving plane, which defines an inlet section I, situated upstream, in which the upper run of the conveyor receives articles 99, in particular blister packs, from the blistering machine, and an outlet station U, situated downstream and cooperating with the feeding line of the boxing machine to release the blister packs 99 (FIG. 1).

The station 1 includes also means, cooperating with the conveyor 2, spaced out with respect to the forward movement direction W, for supporting and guiding corresponding carriages $C_1$, $C_2$, $C_3$, $C_4$, $C_5$, $C_6$, $C_7$, $C_8$.

Figure 2:
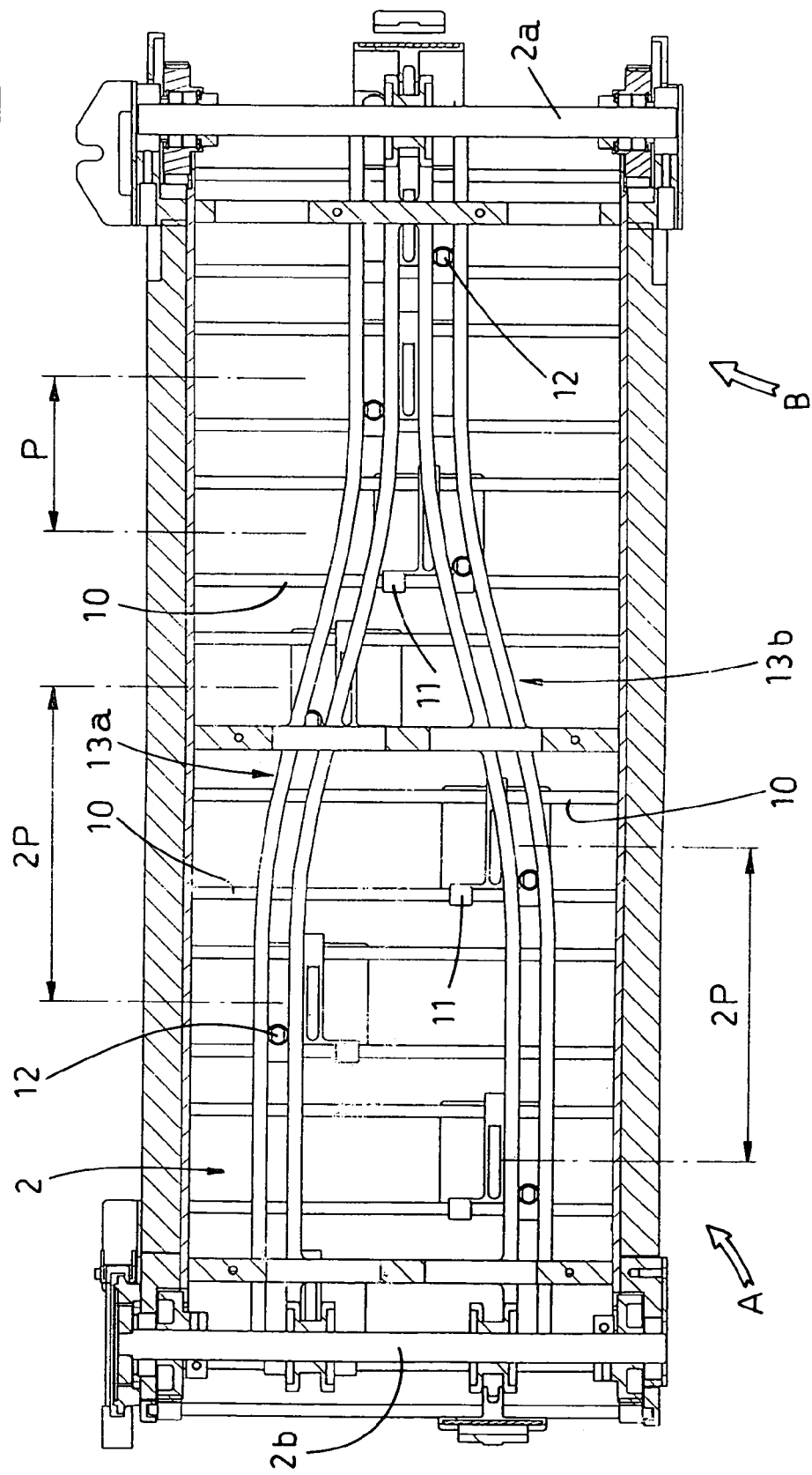
FIG. 2 is a schematic, section view, taken along II—II of FIG. 1.

The above mentioned means allow crosswise moving of the carriages with respect the forward movement direction W of the conveyor 2 (FIG. 2).

Each carriage $C_1$, $C_2$, $C_3$, $C_4$, $C_5$, $C_6$, $C_7$, $C_8$ carries a blister pack 99, indicated with broken line in the Figures.

Suitable first and second means, cooperating with the conveyor 2, operate, crosswise with respect to the forward movement direction W, respectively even carriages $C_2$, $C_4$, $C_6$, $C_8$ and odd carriages $C_1$, $C_3$, $C_5$, $C_7$, from a first configuration A, out of alignment, near the inlet section I of the conveyor 2, to a second, aligned configuration B, near the outlet section U of the conveyor 2.

When in the first configuration A, out of alignment, the even carriages $C_2$, $C_4$, $C_6$; $C_8$, are longitudinally offset, that is transversely spaced apart with respect to the respective odd carriages $C_1$, $C_3$, $C_5$, $C_7$, while in the second, aligned configuration B, the even carriages $C_2$, $C_4$, $C_6$, $C_8$ are longitudinally aligned with the odd carriages $C_1$, $C_3$, $C_5$, $C_7$, with respect to the forward movement direction W (FIG. 3).

Figure 3:
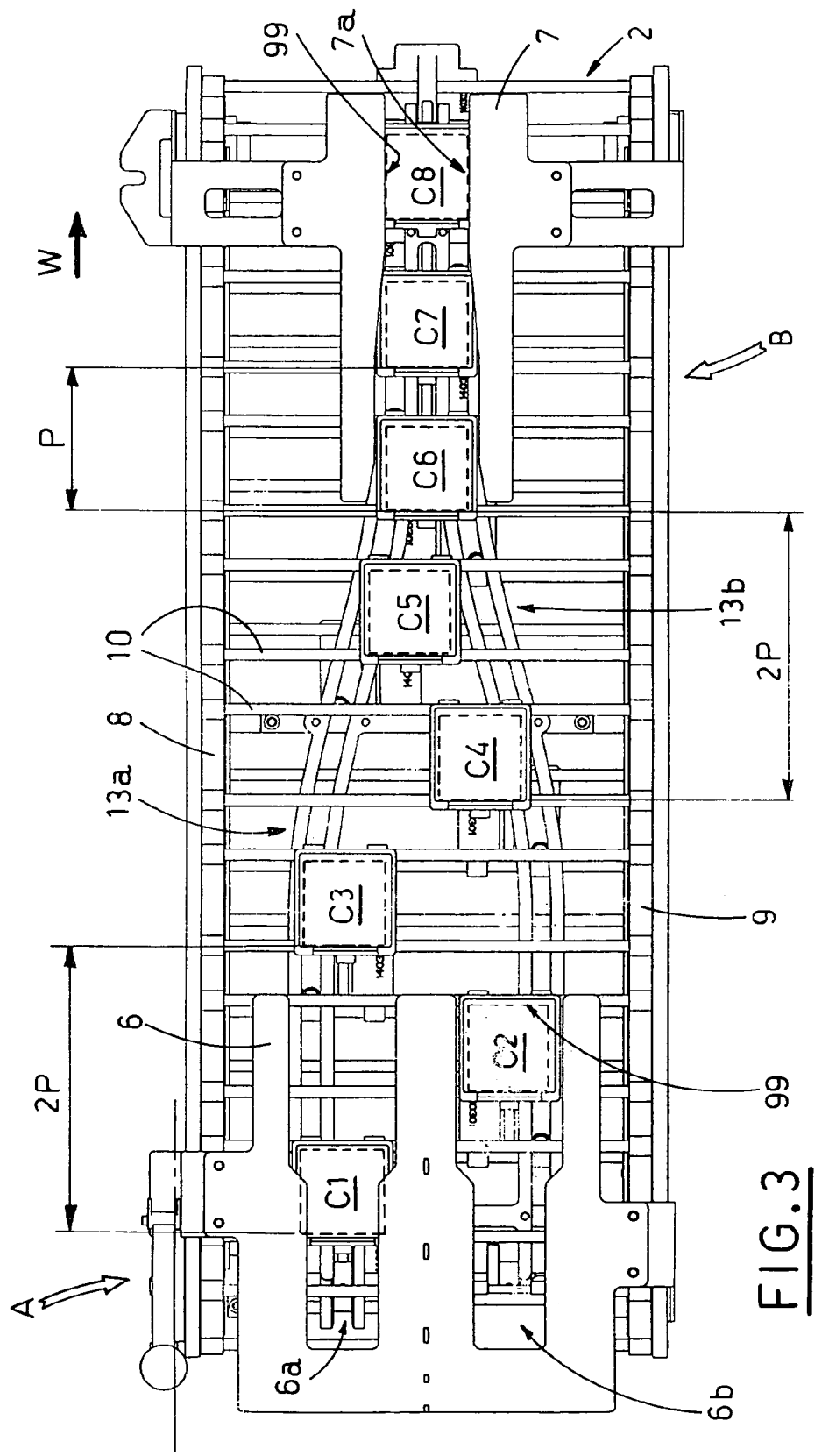
FIG. 3 is a schematic, top view of the station shown in FIG. 1.

According to a preferred embodiment, as pointed out in FIGS. 2 and 3, the carriages of the same order, even $C_2$, $C_4$, $C_6$, $C_8$ and odd $C_1$, $C_3$, $C_5$, $C_7$, are regularly spaced apart with respect to the forward movement direction W by the same main step P2.

In particular, the even carriages $C_2$, $C_4$, $C_6$, $C_8$ are longitudinally offset with respect to the corresponding odd carriages $C_1$, $C_3$, $C_5$, $C_7$ by the same step P.

The station 1 proposed by the present invention includes, in a region corresponding to the inlet section I, a first plate 6, substantially coplanar with the carriages $C_1$, $C_2$, $C_3$, $C_4$, $C_5$, $C_6$, $C_7$, $C_8$, and receiving the blister packs 99 coming from the blistering machine.

The first plate 6 has a pair of longitudinal channels, first channel 6a and second channel 6b, situated one beside the other, whose lateral sides support the blister packs 99 and which receive respectively odd carriages $C_1$, $C_3$, $C_5$, $C_7$ and even carriages $C_2$, $C_4$, $C_6$, $C_8$ in their first offset configuration A, in order to take the blister packs 99.

Figure 4:
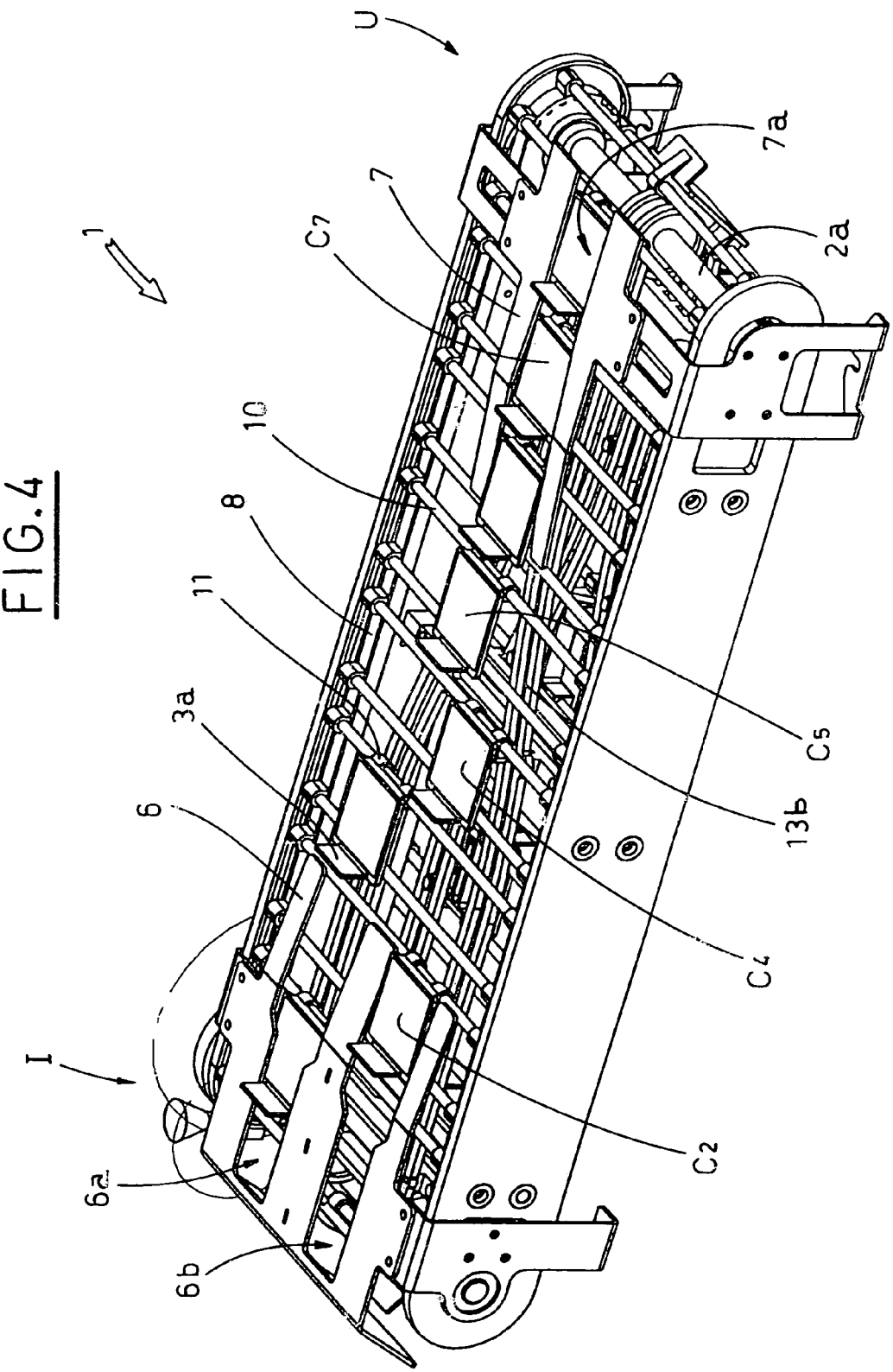
FIG. 4 is a schematic, perspective view of the connection station proposed by the present invention.
Figure 5:
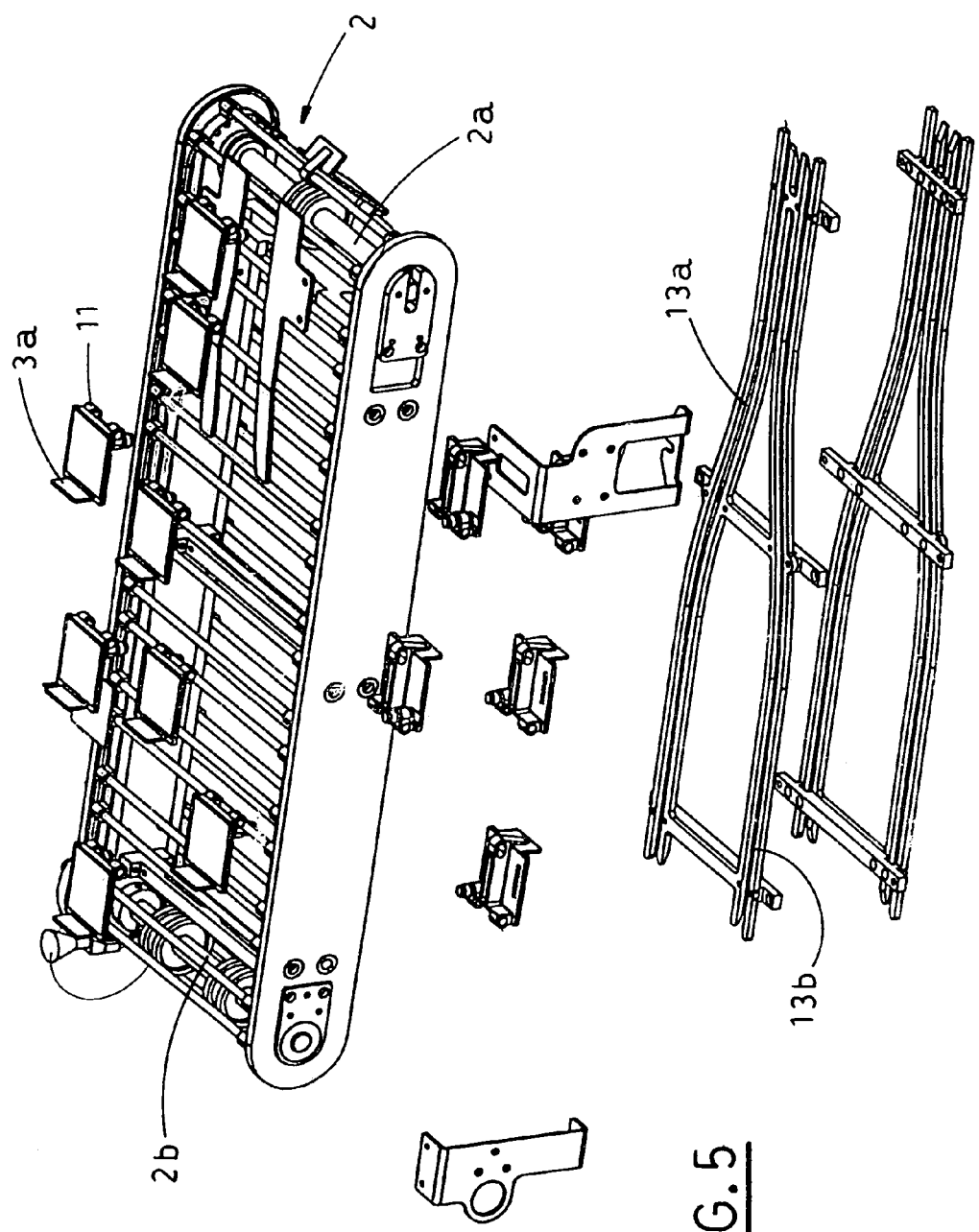
FIG. 5 is a schematic, perspective, partially exploded view in a reduced scale of the station shown in FIG. 4.

As it is shown in FIGS. 4 and 5, each carriage $C_1$, $C_2$, $C_3$, $C_4$, $C_5$, $C_6$, $C_7$, $C_8$ has advantageously a transversal abutment 3a, which hits the blister packs 99 situated on the first plate 6, astride the relative longitudinal channel 6a, 6b.

Moreover, the station 1 includes, in a region corresponding to the outlet section U, a second plate 7, substantially coplanar with the carriages $C_1$, $C_2$, $C_3$, $C_4$, $C_5$, $C_6$, $C_7$, $C_8$ and slightly raised, divided in two parts by a third longitudinal channel 7a, whose lateral sides receive the sides of the blister packs 99 carried by the carriages $C_1$, $C_2$, $C_3$, $C_4$, $C_5$, $C_6$, $C_7$, $C_8$, so as to ensure the contact of the blister packs 99 against the transversal abutment 3a. Two slopes are disposed at the beginning of the two parts of the plate, so as to gently raise the blisters from the carriage surface.

Actually, the contact of the blister packs 99 against the relative transversal abutment 3a of the carriages $C_1$, $C_2$, $C_3$, $C_4$, $C_5$, $C_6$, $C_7$, $C_8$ defines a reference for the feeding line connected to the boxing machine situated downstream.

The feeding line, which is not shown in the figures, begins right at the end of the second plate 7, where the blister arrive in a single line.

According to known techniques, the conveyor 2 includes a pair of rolls, a driving roll 2a and a driven roll 2b, arranged with substantially horizontal axes and provided with cog wheels. A pair of endless chains 8, 9 are mounted on the cog wheels, laying in relative parallel, substantially vertical planes.

According to a particular embodiment, the means for supporting and guiding the carriages $C_1$, $C_2$, $C_3$, $C_4$, $C_5$, $C_6$, $C_7$, $C_8$ include a plurality of transversal bars 10, whose ends are fastened to the chains 8, 9.

Sleeves 11, mounted to the lower part of each carriage $C_1$, $C_2$, $C_3$, $C_4$, $C_5$, $C_6$, $C_7$, $C_8$, slide freely along the transversal bars 10 so as to move the carriages in the forward movement direction W.

Preferably, each even carriage $C_2$, $C_4$, $C_6$, $C_8$ and each odd carriage $C_1$, $C_3$, $C_5$, $C_7$ has a pair of sleeves 11, which slide freely along a corresponding pair of transversal bars 10.

According to a preferred embodiment, the first and second means for transversal motion of the respective carriages, even $C_2$, $C_4$, $C_6$, $C_8$ and odd $C_1$, $C_3$, $C_5$, $C_7$, include a pin 12, which is vertical while running the upper run of the conveyor, made in each even carriage $C_2$, $C_4$, $C_6$, $C_8$ and odd carriage $C_1$, $C_3$, $C_5$, $C_7$ and engaging with first guiding means 13a and second guiding means 13b.

The guiding means allow to operate crosswise the even carriage $C_2$, $C_4$, $C_6$, $C_8$ and odd carriage $C_1$, $C_3$, $C_5$, $C_7$, from the first configuration A, near the inlet section I to the second configuration B, near the outlet section U.

Preferably, the first guiding means 13a include a first track, cooperating with the pins 12 made in each odd carriage $C_1$, $C_3$, $C_5$, $C_7$, and likewise, the second guiding means 13b include a second track, cooperating with the pins 12 made in each even carriage $C_2$, $C_4$, $C_6$, $C_8$.

In the following, the operation principle of the proposed connection station 1 will be described, with reference to a series of blister packs 99, which are released by the blistering machine to the first plate 6, astride the relative longitudinal channels, first 6a and second 6b.

When the first odd carriage, e.g. $C_1$, and the first even carriage, e.g. $C_2$, pass, the transversal abutments 3a hit the blister packs 99 situated on the first plate 6 astride the channels 6a, 6b, keeping them stably on the carriages $C_1$, $C_2$.

During the operation of the carriages $C_1$, $C_2$ from the first configuration A, out of alignment, near the inlet section I, to the second, aligned configuration B, near the outlet section U, the blister packs are guided crosswise by the corresponding, first 13a and second 13b tracks.

When they are near the outlet section U of the station 1, the carriages $C_1$, $C_2$ assume the second, aligned configuration B, in which they are spaced apart by a value equal to the step P and the blister packs 99 carried thereby go in contact with the lateral sides of the third longitudinal channel 7a, so as to ensure the contact of the blister packs 99 against the corresponding transversal abutments 3a.

The above mentioned contact is extremely important, because it defines a reference for the feeding line connected to the boxing machine, situated downstream.

In suitable step relation with the arrival of the carriages $C_1$, $C_2$ to the outlet section U, the blister packs 99 carried thereby are released, in a known way, onto the feeding line of the boxing machine, before the carriage turns down to the return run of the conveyor.

What above repeats in the same sequence for every odd carriage $C_1$, $C_3$, $C_5$, $C_7$ and every even carriage $C_2$, $C_4$, $C_6$, $C_8$.

According to the proposed embodiment, a first track 13a and a second track 13b have been used to guide crosswise the carriages, respectively odd carriages $C_1$, $C_3$, $C_5$, $C_7$ and even carriages $C_2$, $C_4$, $C_6$, $C_8$, however, it is possible to use a plurality of tracks.

It is easily noted from the above description, that the connection station proposed by the present invention can perfectly adapt, in a functional and flexible way, the step, with which a packaging machine, in particular blistering machine, feeds the articles, to the step of the boxes of the feeding line of a boxing machine.

The use of chains operated by rolls, to which transversal bars are fastened, with the sleeves sliding therealong and mounted to the even and odd carriages, allows characteristics of longitudinal support and guide, which are particularly efficient and reliable in any working condition.

The crosswise operation of the even and odd carriages by the pins cooperating with relative first and second track, features the same reliability and functionality.

In relation to the needs, the proposed connection station can perfectly manage a plurality of tracks, a first track and a second track, for crosswise guiding the carriages, respectively odd and even, so as to obtain an aligned configuration of the latter, near the outlet section.

It is easily understood from the above description, that the connection station proposed by the present invention is particularly strong and compact, extremely versatile, especially in relation to different types of blistering machines situated upstream, and that it allows to feed articles in controlled configurations, varying within a wide range, to any boxing machine situated thereafter.

It is understood that the proposed invention has been described, with reference to the enclosed figures, as a mere, not limiting example. Therefore, it is obvious that any changes or variants applied thereto remain within the protective scope defined by the following claims.

What is claimed is:

1. A station for connecting a packaging machine, in particular a blistering machine, with a feeding line associated to a boxing machine, the station comprising:

an endless conveyor having an upper run moving in a forward movement direction and oriented in a substantially horizontal plane to define an inlet section, situated upstream, where said upper run of the conveyor receives articles from a blistering machine, and an outlet section, situated downstream and cooperating with a feeding line of a boxing machine;

two series of carriages, respectively, even carriages and odd carriages, each carriage carrying at least one article;

means, cooperating with said conveyor, spaced out with respect to the forward movement direction, for supporting and guiding said carriages, said means permitting crosswise motion of the carriages with respect to said forward movement direction;

first and second means, cooperating with said conveyor, operating crosswise with respect to the forward movement direction, for shifting said carriages from a first configuration, near the inlet section, in which said even carriages are longitudinally offset, that is transversely spaced apart, with respect to the odd carriages, to a second configuration, near said outlet section, in which said even carriages are aligned with said odd carriages with respect to the forward movement direction, and, a first plate, situated near said inlet section and substantially coplanar with the carriages for receiving the articles coming from the blistering machine; said first plate having at least two longitudinal channels, a first channel and a second channel, situated one beside the other, whose lateral sides support the articles, which are to be taken by respective odd carriages and even carriages in their first offset configuration.

2. The station as claimed in claim 1, wherein said carriages of each series are regularly spaced out with respect to the forward movement direction by a main step.

3. The station as claimed in claim 1, wherein said even carriages are longitudinally offset with respect to the corresponding odd carriages by a same step.

4. The station as claimed in claim 1, wherein each carriage has a transversal abutment for contacting the articles situated on said first plate, astride the longitudinal channel.

5. The station as claimed in claim 4, further comprising, at the outlet section, a second plate, substantially coplanar with said carriages, divided in two parts by a third longitudinal channel with lateral sides receiving the articles carried by said carriages, to ensure the contact of said articles against the corresponding transversal abutments, and two slopes connected to said two parts of said second plate.

6. The station as claimed in claim 1, wherein said conveyor includes a pair of rolls, a driving roll and a driven roll, arranged with substantially horizontal axes, provided with cog wheels and with a pair of endless chains mounted on said cog wheels so as to lay in parallel, substantially vertical planes, said means for supporting and guiding the carriages including a plurality of transversal bars having ends fastened to the chains, with sleeves mounted to the lower part of each carriage and freely sliding along said transversal bars so as to allow the carriages to move in the forward movement direction.

7. The station as claimed in claim 6, wherein each even carriage and each odd carriage has a pair of sleeves, which engage freely with a corresponding pair of transversal bars.

8. The station as claimed in claim 6, wherein said first and second means include at least one pin made in each even carriage and each odd carriage and engaging with respective first guiding means and second guiding means.

9. The station as claimed in claim 8, wherein said first guiding means include at least one first track, cooperating with said pins made in each odd carriage.

10. The station as claimed in claim 8, wherein said second guiding means include at least one second track, cooperating with said pins made in each even carriage.

* * * * *